United States Patent [19]
Tazartes et al.

[11] Patent Number: 5,828,980
[45] Date of Patent: Oct. 27, 1998

[54] CONING COMPENSATION IN STRAPDOWN INERTIAL NAVIGATION SYSTEMS

[75] Inventors: Daniel A. Tazartes, West Hills; John G. Mark, Pasadena, both of Calif.

[73] Assignee: Litton Systems, Inc., Woodland Hills, Calif.

[21] Appl. No.: 937,251

[22] Filed: Jul. 1, 1997

Related U.S. Application Data

[63] Continuation of Ser. No. 618,269, Mar. 18, 1996, abandoned.

[51] Int. Cl.$^6$ .......................................................... G05D 1/00

[52] U.S. Cl. ............................................. 701/220; 702/93

[58] Field of Search .................................... 701/221, 220, 701/207; 702/93

[56] References Cited

U.S. PATENT DOCUMENTS

| | | | |
|---|---|---|---|
| 4,601,206 | 7/1986 | Watson | 73/514 |
| 5,325,173 | 6/1994 | Tazartes et al. | 356/350 |
| 5,343,212 | 8/1994 | Rose et al. | 342/424 |
| 5,410,487 | 4/1995 | Okayama et al. | 364/453 |
| 5,422,817 | 6/1995 | Tazartes et al. | 364/571.01 |
| 5,526,001 | 6/1996 | Rose et al. | 342/442 |

OTHER PUBLICATIONS

M.B. Ignagni, Efficient Class of Optimized Coning Compensation Algorithms, Journal of Guidance, Control and Dynamics, Vol. 19, No. 2, Mar.–Apr. 1996, pp. 424–429, American Institute of Aeronautics and Astronautics.

*Primary Examiner*—Michael Zanelli
*Attorney, Agent, or Firm*—Robert E. Malm

[57] ABSTRACT

The invention is a method for compensating for coning in a strapdown inertial navigation system which utilizes groups of five successive incremental angles of rotation of a body-fixed coordinate system as measured by orthogonally-mounted gyros at regular measurement intervals, each group of five measurements being obtained during a group interval equal to five measurement intervals. The coning-compensated angular displacement of the body-fixed coordinate system about a fixed axis in space during a p'th group interval is obtained by summing the five measured incremental angles and a coning compensation term. The coning compensation term consists of the sum of: (1) one-half the cross-product of a first and a second vector sum, the second vector sum being the sum of the five incremental angles of rotation in a group and the first vector sum being the sum of the second vector sum over p groups; and (2) the weighted sum of three vector cross-products, the multiplier and the multiplicand of each vector cross-product being a weighted sum of five measured incremental angles. The coning-compensated angular displacement can be summed over p to obtain an accurate estimate of the vector angle of rotation over a plurality of group intervals.

24 Claims, 1 Drawing Sheet

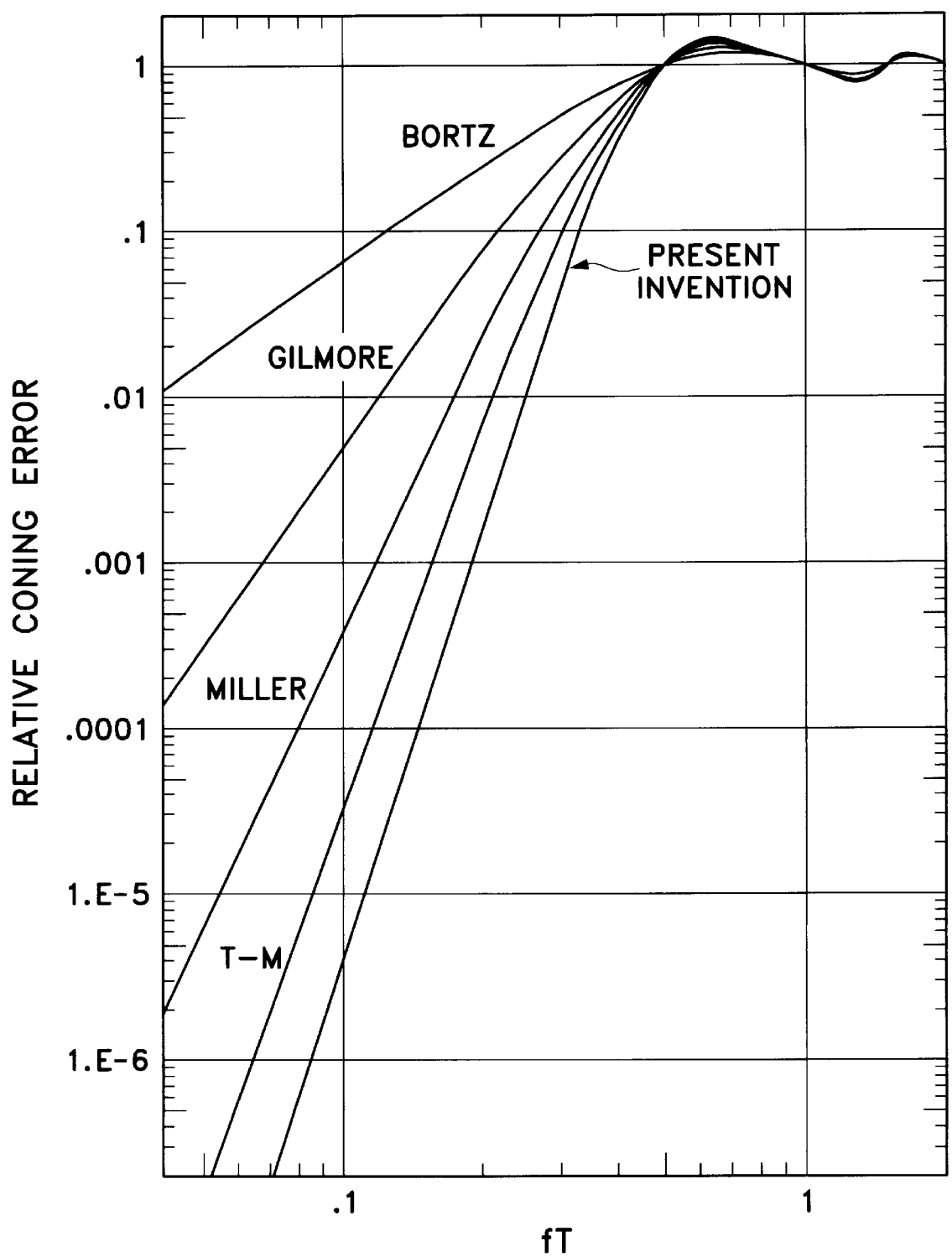

CONING COMPENSATION IN STRAPDOWN INERTIAL NAVIGATION SYSTEMS

This is a continuation of Ser. No. 08/618,269, filed Mar. 18, 1996, abandon.

BACKGROUND OF THE INVENTION

This invention relates to methods and apparatus for compensating for coning in strapdown inertial navigation systems.

Navigation in a local-level (L) coordinate system requires the transformation of accelerometer outputs referenced to a body-fixed (B) coordinate system to local-level coordinates by means of the transformation matrix $C_B^L$, the time derivative of which can be expressed as $(C_B^L W_{IB}^B - W_{IL}^L C_B^L)$. $W_{IB}^B$ is the skew-symmetric matrix form of the vector angular velocity w of the B frame relative to an inertial frame. The gyros fixed in the B frame provide outputs corresponding to the three coordinates of w integrated over time. $W_{IL}^L$ is the skew-symmetric matrix form of the vector angular velocity of the L frame relative to an inertial frame. The integration of $(C_B^L W_{IB}^B - W_{IL}^L C_B^L)$ results in $C_B^L$ which provides the means for transforming the accelerometer outputs into L-frame coordinates.

The integration of the second term in the parenthetical expression is straightforward in that the quantity changes rather slowly with time and is readily integrated with sufficient accuracy at a 400 Hz navigation update rate using available digital processors. The use of strapdown inertial navigation systems on highly-maneuverable military aircraft can result in significant changes in $C_B^L$ during a navigation update interval thereby complicating the integration of the first term in the parenthetical expression.

The change $\Delta C_B^L$ in $C_B^L$ over an update time interval can be expressed as $$\Delta C_B^L = \frac{\sin\phi}{\phi} [\phi] + \frac{(1-\cos\phi)}{\phi^2} [\phi][\phi] \tag{1}$$

where $\phi$ is the vector angle of rotation about a fixed axis which takes the initial $C_B^L$ into the final $C_B^L$, $[\phi]$ is the skew-symmetric matrix form of $\phi$, and $\phi$ is the magnitude of $\phi$. It can be shown that the time rate-of-change of $\phi$ is given by $$\underline{\dot\phi} = \underline{w} + \frac{1}{2}\underline{\phi} \times \underline{w} + \frac{1}{\phi^2}\left(1 - \frac{\phi\sin\phi}{2(1-\cos\phi)}\right)\underline{\phi} \times (\underline{\phi} \times \underline{w}) \tag{2}$$

The high-rate digital integration of equation (2) provides the $\phi$ for the slower update rate of equation (1). At the beginning of the integration period, $\phi$ is equal to zero and if the direction of w is constant over the integration period, $\phi$ is simply the integral of w and points in the same direction as w. For constant-direction w, the second and third terms remain equal to zero during the integration.

When the direction of w changes over the integration period, then the second and third terms of equation (2) must be taken into account. A changing-direction w can be looked upon as a moving w vector where the w vector traces out a portion of the surface of a cone. The contributions to the integration of the second and third terms of equation (2) in this situation are referred to as "coning" compensation.

A number of methods for estimating the coning compensation have been used over the years. The Bortz method is the simplest and is defined by the following calculations.

$$\underline{\theta(p, m)} = \sum_{n=1}^{p} \underline{\Delta\theta(n, m)} \tag{3}$$

$$\underline{R(m)} = \sum_{p=1}^{N} \frac{1}{2} [\underline{\theta(p, m)} \times \underline{\Delta\theta(p, m)}]$$

$$\underline{\phi(m)} = \underline{\theta(N, m)} + \underline{R(m)}$$

The quantity $\Delta\theta(n,m)$ is provided by the gyros. Each of the $\Delta\theta(n,m)$ components is the integral of the angular rate sensed by the corresponding gyro between the (mN+n−1)'th and the (mN+n)'th high-rate computational interval where m, n, and N are integers and n takes on values between 1 and N. Thus, $\Delta\theta(n,m)$ is a vector expression for the incremental angle of rotation of the coordinate system in which the gyros are fixed. The quantity $\phi(m)$ corresponds to the $\phi$ of equation (1) for the m'th update interval. There are N high-rate computational intervals in each update interval. The symbol "x" denotes a vector cross-product operation. The sum in the first of equations (3) corresponds to the integration of w in equation (2) over p high-rate computational intervals. The quantity R(m) is the coning compensation and corresponds to the result of the integration of the second and third terms of equation (2).

The relative error under coning motion for the Bortz method is second order in coning frequency and third order in absolute terms.

The Gilmore-Jordan method is based on the following calculations.

$$\underline{\theta(p, m)} = \sum_{n=1}^{p} \sum_{k=1}^{2} \underline{\Delta\theta(k, n, m)} \tag{4}$$

$$\underline{R(m)} = \sum_{p=1}^{N} \left\{ \frac{1}{2}\left[\underline{\theta(p, m)} \times \sum_{k=1}^{2}\underline{\Delta\theta(k, p, m)}\right] + \frac{2}{3}[\underline{\Delta\theta(1, p, m)} \times \underline{\Delta\theta(2, p, m)}] \right\}$$

$$\underline{\phi(m)} = \underline{\theta(N, m)} + \underline{R(m)}$$

The quantity $\Delta\theta(k,n,m)$ is provided by the gyros and corresponds to the incremental angle of rotation of a coordinate system expressed as a vector and occurring between the (mNK+nK+k−1)'th and the (mNK+nK+k)'th data-sampling intervals where k takes on values between 1 and K. The Gilmore-Jordan method requires two data samples for each high-rate computational interval (K=2).

The relative error under coning motion for the Gilmore-Jordan method is fourth order in coning frequency and fifth order in absolute terms.

The Miller method is based on the following calculations with K equal to 3.

$$\underline{\theta(p, m)} = \sum_{n=1}^{p} \sum_{k=1}^{3} \underline{\Delta\theta(k, n, m)} \tag{5}$$

$$\underline{R(1, m)} = \sum_{p=1}^{N}\left[\underline{\theta(p, m)} \times \sum_{k=1}^{3}\underline{\Delta\theta(k, p, m)}\right]$$

$$\underline{R(2, m)} = \sum_{p=1}^{N}[\underline{\Delta\theta(1, p, m)} \times \underline{\Delta\theta(3, p, m)}]$$

$$\underline{R(3, m)} = \sum_{p=1}^{N}\{\underline{\Delta\theta(2, p, m)} \times [\underline{\Delta\theta(3, p, m)} - \underline{\Delta\theta(1, p, m)}]\}$$

$$\underline{R(m)} = \frac{1}{2}\underline{R(1, m)} + \frac{33}{80}\underline{R(2, m)} + \frac{57}{80}\underline{R(3, m)}$$

$$\underline{\phi(m)} = \underline{\theta(N, m)} + \underline{R(m)}$$

The enhanced Miller method is defined by the following calculations.

$$\theta(p, m) = \sum_{n=1}^{p} \sum_{k=1}^{3} \Delta\theta(k, n, m) \qquad (6)$$

$$R(1, m) = \sum_{p=1}^{N} \left[ \theta(p, m) \times \sum_{k=1}^{3} \Delta\theta(k, p, m) \right]$$

$$R(2, m) = \sum_{p=1}^{N} \{[\Delta\theta(1, p, m) + 3\Delta\theta(2, p, m)] \times \Delta\theta(3, p, m)\}$$

$$R(m) = \frac{1}{2} R(1, m) + \frac{9}{20} R(2, m)$$

$$\phi(m) = \theta(N, m) + R(m)$$

The relative error under coning motion for the enhanced Miller method is sixth order in coning frequency and seventh order in absolute terms.

The Tazartes-Mark method for which K=4 is defined by the following calculations.

$$\theta(p, m) = \sum_{n=1}^{p} \sum_{k=1}^{4} \Delta\theta(k, n, m) \qquad (7)$$

$$R(1, m) =$$

$$\sum_{p=1}^{N} \left\{ [3\theta(p, m) + 4(\Delta\theta(1, p, m) + \Delta\theta(2, p, m))] \times \sum_{k=1}^{4} \Delta\theta(k, p, m) \right\}$$

$$R(2, m) =$$

$$\sum_{p=1}^{N} \{\Delta\theta(1, p, m) \times [9\Delta\theta(2, p, m) - 3\Delta\theta(3, p, m) - \Delta\theta(4, p, m)]\}$$

$$R(3, m) =$$

$$\sum_{p=1}^{N} \{[9\Delta\theta(3, p, m) - 3\Delta\theta(2, p, m) - \Delta\theta(1, p, m)] \times \Delta\theta(4, p, m)\}$$

$$R(m) = \frac{1}{6} R(1, m) + \frac{16}{210} R(2, m) + \frac{16}{210} R(3, m)$$

$$\phi(m) = \theta(N, m) + R(m)$$

The relative error under coning motion for the Tazartes-Mark method is eighth order in coning frequency and ninth order in absolute terms.

It would be desirable to have a method based on an even larger number of data samples for an update interval. However, it becomes increasingly difficult to optimize the method using reasonably small integer weights.

SUMMARY OF THE INVENTION

The invention is a method for compensating for coning in a strapdown inertial navigation system which utilizes groups of five successive incremental angles of rotation of a body-fixed coordinate system as measured by orthogonally-mounted gyros at regular measurement intervals, each group of five measurements being obtained during a group interval equal to five measurement intervals. The coning-compensated angular displacement of the body-fixed coordinate system about a fixed axis in space during a p'th group interval is obtained by summing the five measured incremental angles and a coning compensation term. The coning compensation term consists of the sum of: (1) one-half the cross-product of a first and a second vector sum, the second vector sum being the sum of the five incremental angles of rotation in a group and the first vector sum being the sum of the second vector sum over p groups; and (2) the weighted sum of three vector cross-products, the multiplier and the multiplicand of each vector cross-product being a weighted sum of five measured incremental angles. The coning-compensated angular displacement can be summed over p to obtain an accurate estimate of the vector angle of rotation over a plurality of group intervals.

BRIEF DESCRIPTION OF THE DRAWINGS

FIG. 1 provides a graphical depiction of the relative accuracies of the coning compensation methods of Bortz, Gilmore-Jordan, Miller, Tazartes-Mark, and the present invention.

DESCRIPTION OF THE PREFERRED EMBODIMENTS

One of most critical functions performed in an inertial navigation system is the measurement of acceleration which provides the basis for continual position determination. The first step is to integrate acceleration to obtain velocity. Since the velocity must be expressed in local-level coordinates and the acceleration is measured with body-mounted accelerometers, the integration task is complicated by the rotation of the body-fixed coordinate system with respect to the local-level coordinate system. The task becomes particularly difficult when the angular velocity vector of the body-fixed coordinate system can itself be moving. This condition, which is referred to as "coning", requires for high navigation accuracy that coning compensation be incorporated in the computational process for determining the position of the inertial navigation system in local-level coordinates.

The coning compensation method of the present invention is defined by the following calculations which are performed as part of the overall navigation solution.

$$\theta(p, m) = \sum_{n=1}^{p} \sum_{k=1}^{5} \Delta\theta(k, n, m) \qquad (8)$$

$$R(0, m) = \sum_{n=1}^{N} \left[ \theta(n, m) \times \sum_{k=1}^{5} \Delta\theta(k, n, m) \right]$$

$$R(h, m) = \sum_{n=1}^{N} \sum_{k=1}^{5} [U(h, k)\Delta\theta(k, n, m) \times V(h, k)\Delta\theta(k, n, m)]$$

$$R(m) = \sum_{h=1}^{3} W(h)R(h, m)$$

$$\phi(m) = \theta(N, m) + \frac{1}{2} R(0, m) + R(m)$$

The quantity $\Delta\theta(k,n,m)$ corresponds to the vector angle of rotation for the (mNK+nK+k)'th data sampling interval of duration T, as provided by orthogonally mounted gyros in a body-fixed coordinate system. The quantities k, n, and m are integers where k takes on values from 1 to K and n takes on values from 1 to N. For the present invention, K equals 5.

The quantities $U(h,k)$, $V(h,k)$, and $W(h)$ are numerical "weights". The quantity "x" denotes a vector cross-product operation. The sum in the first of equations (3) corresponds to the integration of w in equation (2). The sum of the quantities ½ $R(0m)$ and $R(m)$ is the coning compensation and corresponds to the integration of the second and third terms of equation (2).

The summations over n in the first three of equations (8) are obtained by an accumulation process as each measured incremental angle becomes available. The navigation solution update interval corresponds to NKT. The desired navigation solution update interval is achieved by the appropriate choice of N.

The weights are as follows:

| | | | | |
|---|---|---|---|---|
| U(1, 1) = 1 | U(1, 2) = 1 | U(1, 3) = 0 | U(1, 4) = −1 | U(1,5) = −1 |
| U(2, 1) = 1 | U(2, 2) = 0 | U(2, 3) = 0 | U(2, 4) = 0 | U(2, 5) = 0 |
| U(3, 1) = 1 | U(3, 2) = 3 | U(3, 3) = −10 | U(3, 4) = 28 | U(3, 5) = −22 |
| V(1, 1) = 1 | V(1, 2) = 1 | V(1, 3) = 3 | V(1, 4) = 1 | V(1, 5) = 1 |
| V(2, 1) = −22 | V(2, 2) = 28 | V(2, 3) = −10 | V(2, 4) = 3 | V(2, 5) = 1 |
| V(3, 1) = 0 | V(3, 2) = 0 | V(3, 3) = 0 | V(3, 4) = 0 | V(3, 5) = 1 |
| W(1) = 225/1008 | | W(2) = 225/9072 | | W(3) = 225/9072 |

The relative error under coning motion for the method of the present invention is tenth order in coning frequency and eleventh order in absolute terms.

Plots of the relative coning error of the four methods discussed above together with the method of the present invention are shown in FIG. 1. The quantity f is the coning frequency and T is the data sampling interval.

What is claimed is:

1. A coning compensation method for use in a strapdown inertial navigation system, the method utilizing the incremental angles of rotation of a coordinate system expressed as a vector $\Delta\Theta(k,n,m)$ and measured in successive time periods to obtain an estimate of the coning compensation for NK successive time periods, the vector $\Delta\Theta(k,n,m)$ corresponding to the vector angle of rotation for the (mNK+nK+k)'th data sampling interval of duration T as provided by orthogonally mounted gyros in a body-fixed coordinate system, k taking on integer values from 1 to K, n taking on integer values from 1 to N, m taking on integer values, N and K being predetermined integers, the method comprising the steps:

calculating R(h,m) for K equal to 5 and h equal to 1, 2, and 3, R(h,m) being the vector cross-product of the sum of $U(h,k)\Delta\Theta(k,n,m)$ and the sum of $V(h,k)\Delta\Theta(k,n,m)$, the sums being taken over all values of k and all values of n, U(h,k) and V(h,k) being predetermined numbers for all values of h and k;

calculating R(m), R(m) being the sum of W(h)R(h,m) over all values of h, W(h) being a predetermined number for each value of h where h takes on the values 1, 2, and 3, the estimate of the coning compensation comprising R(m).

2. The coning compensation method of claim 1 further comprising the steps:

calculating $\Theta(p,m)$, $\Theta(p,m)$ being the sum of $\Delta\Theta(k,n,m)$ over k and n, k taking on integer values from 1 to K and n taking on integer values from 1 to p;

calculating R(0,m) for K equal to 5, R(0,m) being the sum over n of the vector cross-product of $\Theta(n,m)$ and the sum over k of $\Delta\Theta(k,n,m)$, the estimate of the coning compensation further comprising ½ R(0,m).

3. The coning compensation method of claim 1 wherein W(1) is greater than W(2) and W(3), W(2) being equal to W(3).

4. The coning compensation method of claim 1 wherein either U(1,k)=−U(1,K+1−k) or V(1,k)=−V(1,K+1−k).

5. The coning compensation method of claim 1 wherein either U(1,k)=U(1,K+1−k) or V(1,k)=V(1,K+1−k).

6. The coning compensation method of claim 1 wherein either U(2,k)=V(2,K+1−k) or U(2,k)=V(3,K+1−k).

7. The coning compensation method of claim 1 wherein either U(3,k)=V(2,K+1−k) or U(3,k)=V(3,K+1−k).

8. The coning compensation method of claim 1 wherein either U(2,k)=0 or V(2,k)=0 and either U(3,k)=0 or V(3,k)=0 for all but one value of k.

9. The coning compensation method of claim 1 wherein U(h,k) and U(h,k+1) are opposite in sign for k equal to 2, 3, and 4 and h equal to either 2 or 3 and V(h,k) and V(h,k+1) are opposite in sign for k equal to 1, 2, and 3 and h equal to either 2 or 3.

10. The coning compensation method of claim 1 wherein U(h,k) and V(h,k) are equal to integers for all values of h and for all values of k.

11. The coning compensation method of claim 1 wherein U(1,1)=1, U(1,2)=1, U(1,3)=0, U(1,4)=−1, U(1,5)=−1, U(2,1)=1, U(2,2)=0, U(2,3)=0, U(2,4)=0, U(2,5)=0, U(3,1)=1, U(3,2)=3, U(3,3)=−10, U(3,4)=28, U(3,5)=−22, V(1,1)=1, V(1,2)=1, V(1,3)=3, V(1,4)=1, V(1,5)=1, V(2,1)=−22, V(2,2)=28, V(2,3)=−10, V(2,4)=3, V(2,5)=1, V(3,1)=0, V(3,2)=0, V(3,3)=0, V(3,4)=0, V(3,5)=1.

12. The coning compensation method of claim 1 wherein W(1)=225/1008, W(2)=225/9072, and W(3)=225/9072.

13. A digital processor for use in a strapdown inertial navigation system, the digital processor receiving as inputs the incremental angles of rotation of a coordinate system expressed as a vector $\Delta\Theta(k,n,m)$ and measured in successive time periods to obtain an estimate of the coning compensation for NK successive time periods, the vector $\Delta\Theta(k,n,m)$ corresponding to the vector angle of rotation for the (mNK+nK+k)'th data sampling interval of duration T as provided by orthogonally mounted gyros in a body-fixed coordinate system, k taking on integer values from 1 to K, n taking on integer values from 1 to N, m taking on integer values, N and K being predetermined integers, the functions performed by the digital processor comprising:

calculating R(h,m) for K equal to 5 and h equal to 1, 2, and 3,R(h,m) being the vector cross-product of the sum of $U(h,k)\Delta\Theta(k,n,m)$ and the sum of $V(h,k)\Delta\Theta(k,n,m)$ the sums being taken over all values of k and all values of n, U(h,k) and V(h,k) being predetermined numbers for all values of h and k;

calculating R(m), R(m) being the sum of W(h)R(h,m) over all values of h, W(h) being a predetermined number for each value of h where h takes on the values 1, 2, and 3, the estimate of the coning compensation comprising R(m).

14. The digital processor of claim 13 wherein W(1)=225/1008, W(2)=225/9072, and W(3)=225/9072.

15. The digital processor of claim 13 wherein the functions performed by the digital processor further comprise:

calculating $\Theta(p,m)$, $\Theta(p,m)$ being the sum of $\Delta\Theta(k,n,m)$ over k and n, k taking on integer values from 1 to K and n taking on integer values from 1 to p;

calculating R(0,m) for K equal to 5, R(0,m) being the sum over n of the vector cross-product of $\Theta(n,m)$ and the sum over k of $\Delta\Theta(k,n,m)$, the estimate of the coning compensation further comprising ½ R(0,m).

16. The digital processor of claim 13 wherein W(1) is greater than W(2) and W(3), W(2) being equal to W(3).

17. The digital processor of claim 13 wherein either U(1,k)=−U(1,K+1−k) or V(1,k)=−V(1,K+1−k).

18. The digital processor of claim 13 wherein either $U(1,k)=U(1,K+1-k)$ or $V(1,k)=V(1,K+1-k)$.

19. The digital processor of claim 13 wherein either $U(2,k)=V(2,K+1-k)$ or $U(2,k)=V(3,K+1-k)$.

20. The digital processor of claim 13 wherein either $U(3,k)=V(2,K+1-k)$ or $U(3,k)=V(3,K+1-k)$.

21. The digital processor of claim 13 wherein either $U(2,k)=0$ or $V(2,k)=0$ and either $U(3,k)=0$ or $V(3,k)=0$ for all but one value of k.

22. The digital processor of claim 13 wherein $U(h,k)$ and $U(h,k+1)$ are opposite in sign for k equal to 2, 3, and 4 and h equal to either 2 or 3 and $V(h,k)$ and $V(h,k+1)$ are opposite in sign for k equal to 1, 2, and 3 and h equal to either 2 or 3.

23. The digital processor of claim 13 wherein $U(h,k)$ and $V(h,k)$ are equal to integers for all values of h and for all values of k.

24. The digital processor of claim 13 wherein $U(1,1)=1$, $U(1,2)=1$, $U(1,3)=0$, $U(1,4)=-1$, $U(1,5)=-1$, $U(2,1)=1$, $U(2,2)=0$, $U(2,3)=0$, $U(2,4)=0$, $U(2,5)=0$, $U(3,1)=1$, $U(3,2)=3$, $U(3,3)=-10$, $U(3,4)=28$, $U(3,5)=-22$, $V(1,1)=1$, $V(1,2)=1$, $V(1,3)=3$, $V(1,4)=1$, $V(1,5)=1$, $V(2,1)=-22$, $V(2,2)=28$, $V(2,3)=-10$, $V(2,4)=3$, $V(2,5)=1$, $V(3,1)=0$, $V(3,2)=0$, $V(3,3)=0$, $V(3,4)=0$, $V(3,5)=1$.

* * * * *